(12) United States Patent
Yano

(10) Patent No.: US 12,003,848 B2
(45) Date of Patent: Jun. 4, 2024

(54) IMAGING APPARATUS MOUNTED ON MOVING OBJECT AND MOVING OBJECT INCLUDING IMAGING APPARATUS

(71) Applicant: CANON KABUSHIKI KAISHA, Tokyo (JP)

(72) Inventor: Hiroshi Yano, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/725,360

(22) Filed: Apr. 20, 2022

(65) Prior Publication Data
US 2022/0353419 A1  Nov. 3, 2022

(30) Foreign Application Priority Data
Apr. 28, 2021  (JP) ................................ 2021-076753

(51) Int. Cl.
| | |
|---|---|
| *H04N 23/63* | (2023.01) |
| *B60R 1/26* | (2022.01) |
| *H04N 5/265* | (2006.01) |
| *H04N 23/54* | (2023.01) |

(52) U.S. Cl.
CPC ............. *H04N 23/63* (2023.01); *B60R 1/26* (2022.01); *H04N 5/265* (2013.01); *H04N 23/54* (2023.01)

(58) Field of Classification Search
CPC ..................................................... H04N 23/63
USPC ......................................................... 348/335
See application file for complete search history.

(56) References Cited

U.S. PATENT DOCUMENTS

2020/0348515 A1*  11/2020  Peuhkurinen ...... G02B 27/0172

FOREIGN PATENT DOCUMENTS

| JP | 2001-63461 A | 3/2001 | |
|---|---|---|---|
| JP | 2008-160508 A | 7/2008 | |
| JP | 2011-40825 A | 2/2011 | |
| JP | 2013161440 A | 8/2013 | |
| WO | WO-2018207393 A1 * | 11/2018 | ............... B60R 1/00 |

* cited by examiner

*Primary Examiner* — Joel W Fosselman
(74) *Attorney, Agent, or Firm* — CANON U.S.A., INC. IP Division

(57) ABSTRACT

An imaging apparatus provided in a moving object to capture an image of an area behind the moving object includes an imaging circuit and an optical system. The imaging circuit outputs an image based on an optical image input to a light-receiving surface. The optical system inputs the optical image to the imaging circuit. The optical system forms a first region at a first magnification and a second region at a second magnification lower than the first magnification. The second region is formed around the first region. The imaging apparatus is installed in the moving object so that, on the light-receiving surface of the imaging circuit, an axis passing through a center of the first region and extending in a direction from which the optical system receives light is inclined toward an upper side of the moving object with respect to a backward direction of the moving object.

12 Claims, 7 Drawing Sheets

IMAGING APPARATUS MOUNTED ON MOVING OBJECT AND MOVING OBJECT INCLUDING IMAGING APPARATUS

BACKGROUND

Technical Field

One disclosed aspect of the embodiments relates to an imaging apparatus mounted on a moving object and the moving object including the imaging apparatus.

Description of the Related Art

A camera mounted on a moving object to capture an image of the rear of the moving object has the following two major purposes. One is an electronic rear-view mirror purpose. The camera is used to capture an image to be displayed on the electronic rear-view mirror, which is provided for a driver to check the area behind the moving object during normal traveling. At this time, the camera is required to have such a resolution and a dynamic range for image-capturing as to allow a driver to check a region that has been viewable with a conventional rear-view mirror with visibility greater than or equal to that with the conventional rear-view mirror.

Another purpose is a rear-view monitoring purpose. The camera is used to capture an image of the area behind the moving object at a wide angle of view, so that the driver can check the area behind the moving object when making a backward movement. When the driver operates the moving object to move backward, an angle of view that allows the camera to capture an image of the area behind the moving object in a wide range is required so that the driver can recognize an object that may possibly enter an expected path of the moving object. Hence, a wide angle of view in a vertical direction is required of the camera so that the driver can view a wide region from another moving object or the like approaching from behind to a location directly underneath in the backward direction of the moving object, including a region in the vicinity of the area behind the moving object.

Japanese Patent Application Laid-Open No. 2013-161440 proposes a vehicle surroundings monitoring device that switches a display mode of a display depending on whether an object around a vehicle is detected and a start operation of the vehicle is detected.

Nevertheless, although the vehicle surroundings monitoring device discussed in Japanese Patent Application Laid-Open No. 2013-161440 satisfies the angle of view required when the moving object moves backward, the vehicle surroundings monitoring device does not satisfy visibility required during normal traveling, i.e., a high-resolution image.

SUMMARY

According to an aspect of the embodiments, an imaging apparatus provided in a moving object to capture an image of an area behind the moving object includes an imaging circuit and an optical system. The imaging circuit is configured to output an image based on an optical image input to a light-receiving surface. The optical system is configured to input the optical image to the imaging circuit. The optical system forms a first region at a first magnification and a second region at a second magnification lower than the first magnification. The second region is formed around the first region. The imaging apparatus is installed in the moving object so that, on the light-receiving surface of the imaging circuit, an axis passing through a center of the first region and extending in a direction from which the optical system receives light is inclined toward an upper side of the moving object with respect to a backward direction of the moving object.

Further features of the disclosure will become apparent from the following description of exemplary embodiments with reference to the attached drawings.

DESCRIPTION OF THE EMBODIMENTS

Exemplary embodiments of the disclosure will be described with reference to the attached drawings. In the following, the term "unit" may be used to refer to a circuit, a subsystem, a module, a functional block, a logic device, a physical device, a processor, or hardware elements. It may include mechanical, optical, or electrical components, or any combination of them. It may include active (e.g., transistors) or passive (e.g., capacitors) components. It may include one or more programmable processors, such as a central processing unit (CPU) or a microprocessor, that are configured to execute instructions or programs stored in one or more memory devices to perform specified operations. It may include logic elements such as AND-OR, and NOT elements implemented by transistor circuits or any other switching circuits. Typical combinational logic functions may be implemented by switching circuits such as multiplexers (to implement select functions), encoders, and decoders.

Figure 1:
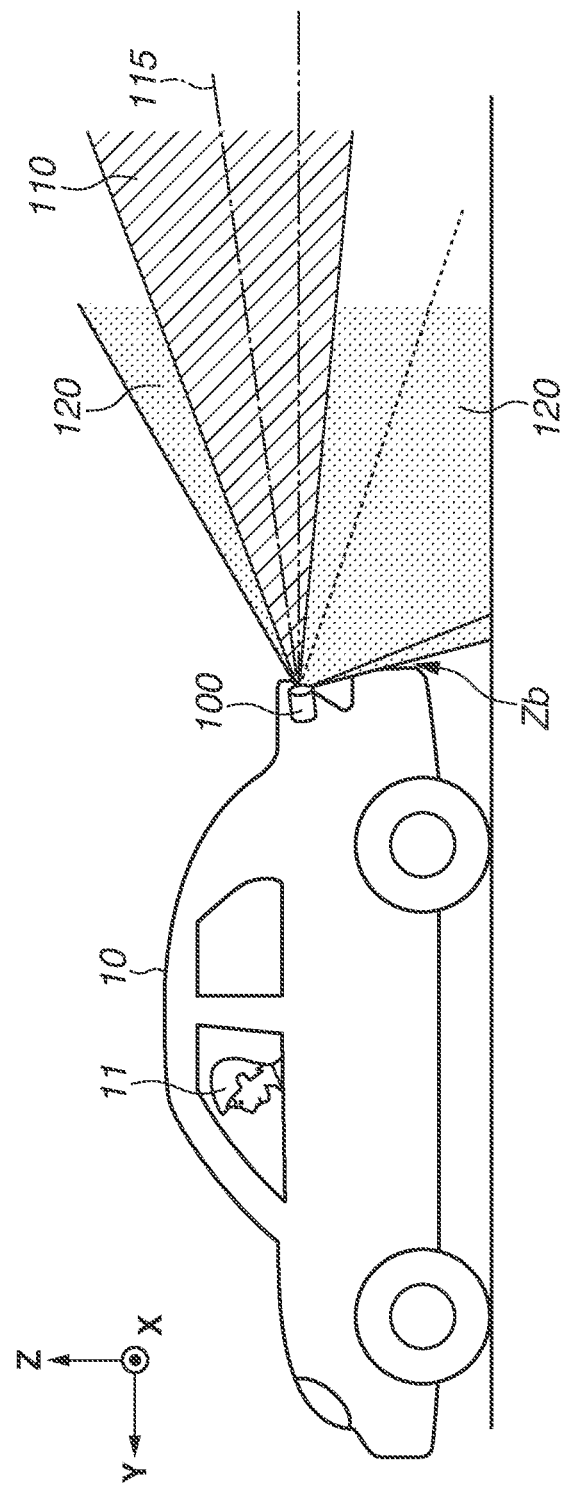
FIG. 1 is a side view schematically illustrating a moving object and an imaging apparatus provided in the moving object.

FIG. 1 is a side view schematically illustrating a moving object and an imaging apparatus provided in the moving object. A moving object 10 is a vehicle on which a driver 11 rides and that is capable of moving to a freely selected location. In FIG. 1, a leftward direction (Y-axis positive direction) corresponds to a front side of the moving object 10, and a rightward direction (Y-axis negative direction) corresponds to a rear or back side of the moving object 10. Additionally, in FIG. 1, an upward direction (Z-axis positive direction) corresponds to an upper side of the moving object 10, and a downward direction (Z-axis negative direction) corresponds to a lower side of the moving object 10.

A camera 100 is an imaging apparatus that is provided in a rear portion of the moving object 10 and that captures an image of another object or a scene, separated from the moving object 10, located in the rear of, or the area behind, the moving object 10. The camera 100 is arranged so that an optical axis 115 of an optical system is inclined upward with respect to an axis (Y-axis) in a traveling direction of the moving object 10. The optical axis 115 of the optical system passes through the center of a high-resolution region of the optical system of the camera 100, which will be described below. In other words, the camera 100 is installed so that the optical axis 115 passing through the center of the high-resolution region and extending in a direction in which the optical system receives light is inclined toward the upper side of the moving object 10 with respect to the backward direction of the moving object 10.

The camera 100 includes the optical system that forms the high-resolution region in which a magnification in optical image formation is high and a peripheral resolution region in which a magnification in the optical image formation is lower than that in the high-resolution region. Thus, the camera 100 is capable of acquiring a high-resolution partial image even when capturing a wide-angle image. A viewing field range (angle of view) in which the camera 100 captures an image includes a viewing field range 110 corresponding to the high-resolution region and a viewing field range 120 corresponding to the peripheral resolution region.

The viewing field range 110 can be said as a region in which light is incident on an image pickup device of the camera 100 through the high-resolution region of the optical system of the camera 100. The viewing field range 120 can be said as a region in which light is incident on the image pickup device of the camera 100 through the peripheral resolution region of the optical system of the camera 100.

The viewing field range 110 includes the optical axis 115. The camera 100 is installed in the moving object 10 so that the viewing field range 110 includes a straight line that extends from an installation position of the camera 100 in the moving object 10 in the backward direction of the moving object 10.

The camera 100 is installed so that a rear end portion of the camera 100 is positioned on the front side of a rear end portion of the moving object 10. The viewing field range 120 is provided so as to surround the viewing field range 110. The viewing field range 120 includes at least a lower end portion (rear end portion) on the rear side of the moving object 10.

Figure 2:
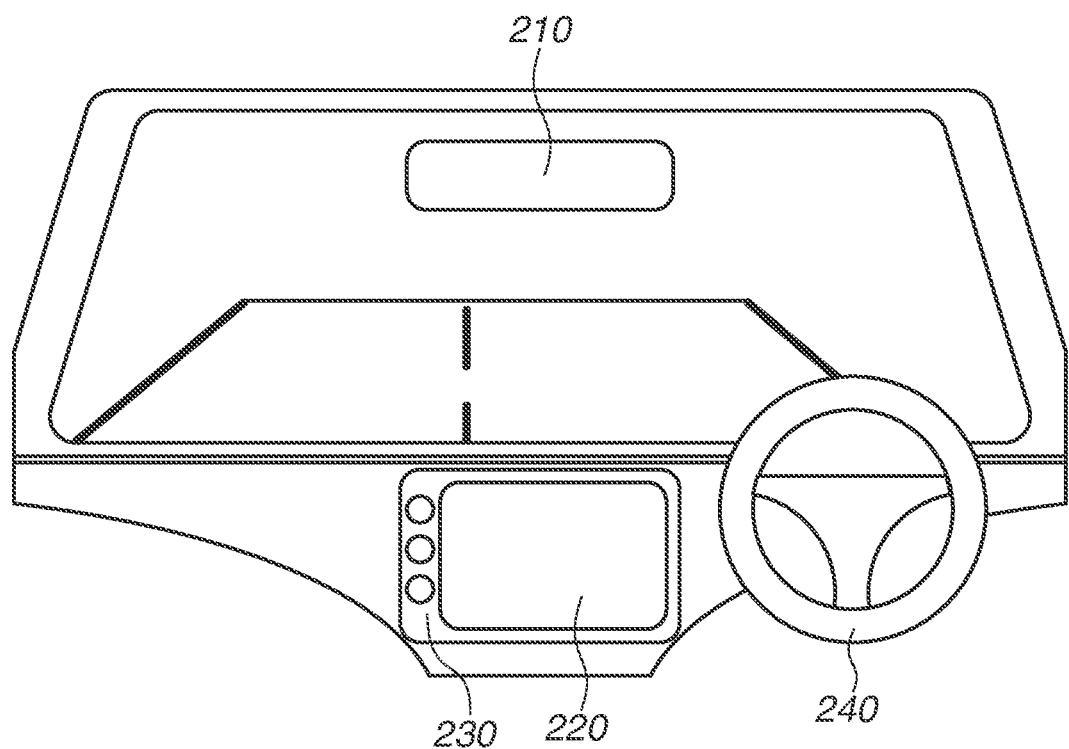
FIG. 2 is a schematic diagram illustrating an interior of the moving object viewed from a driver.

FIG. 2 is a schematic diagram illustrating an interior of the moving object 10 viewed from the driver 11. An electronic rear-view mirror 210, a monitor 220, an operation unit or circuit 230, a steering wheel 240, and the like are arranged in the interior of the moving object 10.

The electronic rear-view mirror 210 is a display apparatus that displays an image including part of a captured image of the viewing field range 110 corresponding to the high-resolution region, of an image captured by the camera 100. The electronic rear-view mirror 210 is capable of switching between an electronic rear-view mirror mode for displaying an optical mirror image and an electronic rear-view mirror mode for displaying the image captured by the camera 100.

The monitor 220 is a display apparatus capable of displaying the image captured by the camera 100. On the monitor 220, an image for checking the area behind the moving object 10 is displayed when the moving object 10 moves backward. In addition, the monitor 220 is also capable of displaying a map image output from a car navigation system and a graphical user interface (GUI) for controlling a function of an audio device of the moving object 10.

The operation unit 230 is an operation member for accepting a user operation, such as a dial and a button. Via the operation unit 230, it is possible to display the GUI of the monitor 220 and control a function of an air-conditioner or the like.

The steering wheel 240 is an operation member for controlling the traveling direction (navigation angle) of the moving object 10. The driver 11 operates the steering wheel 240 to control the traveling direction of the moving object 10.

Figure 3:
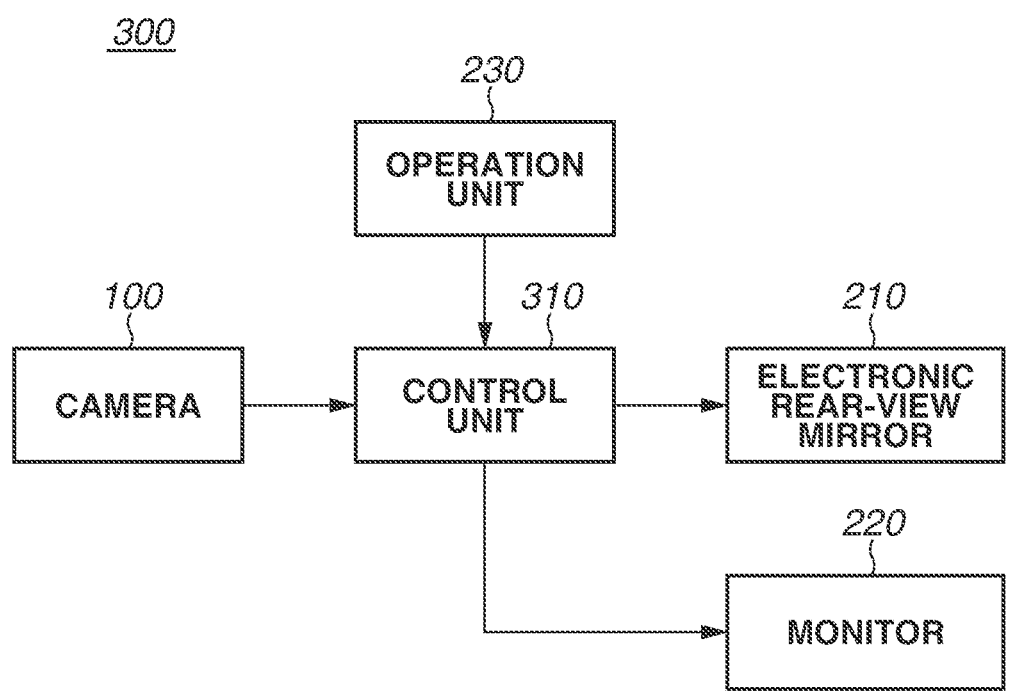
FIG. 3 is a block diagram illustrating a camera system of the moving object.

FIG. 3 is a block diagram illustrating a camera system 300 of the moving object 10. The camera system 300 includes the camera 100, the electronic rear-view mirror 210, the monitor 220, and a control unit or circuit 310.

The camera 100, the electronic rear-view mirror 210, and the monitor 220 have already been described above, and thus descriptions thereof are not repeated.

The control unit 310 executes display control processing of displaying an image on the electronic rear-view mirror 210 and the monitor 220 based on an image acquired from the camera 100. The control unit 310 includes at least one or more processors. In addition, part of functions executed by the control unit 310 may be implemented by at least one or more electronic circuits.

The control unit 310 causes the electronic rear-view mirror 210 to display a partial image obtained by cutting out a region centering on a portion that is a captured image of the viewing field range 110 corresponding to the high-resolution region, from the image acquired from the camera 100. Further, when the moving object 10 moves backward, the control unit 310 causes the monitor 220 to display the whole image acquired from the camera 100. Alternatively, when the moving object 10 moves backward, the control unit 310 may cause the monitor 220 to display a partial image obtained by cutting out a lower region of the image so as to include the rear end portion of the moving object 10 from the image acquired from the camera 100. The partial image displayed on the monitor 220 corresponds to a wider range of the captured image than a range of the captured image to which the partial image displayed on the electronic rear-view mirror 210 correspond.

Figure 4:
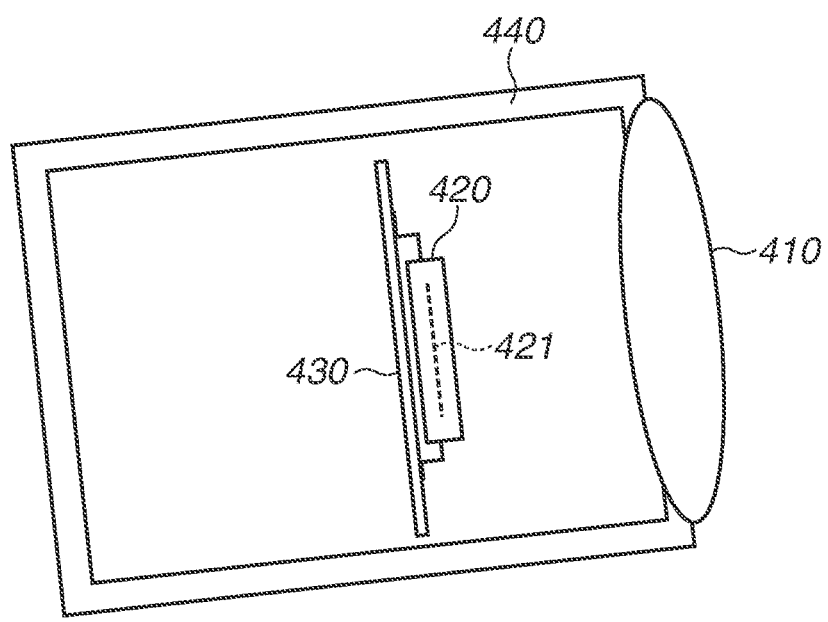
FIG. 4 is a schematic diagram illustrating a structure of a camera.

FIG. 4 is a schematic diagram illustrating a structure of the camera 100. The camera 100 includes an optical system 410, an image pickup device 420, a circuit substrate 430, and a housing 440.

The optical system 410 is an optical system including a plurality of lenses that forms an optical subject image (optical image) from external light. The optical system 410 inputs the optical image to the image pickup device 420. The optical system 410 is an optical system that forms, with a center on the optical axis 115, the high-resolution region in which a magnification in optical image formation is high, and the peripheral resolution region in which a magnification in optical image formation is lower than that in the high-resolution region. For simplification of the drawing, FIG. 4 illustrates the optical system 410 as one lens.

The image pickup device 420 is a sensor that converts the optical subject image input to a light-receiving surface and acquired from the optical system 410 into electric signals. External light incident on the optical system 410 is formed as an image on a light-receiving surface 421, which is a photoelectric conversion area on the image pickup device 420, and is converted into electric signals. On the light-receiving surface 421, a plurality of photoelectric conversion devices is arranged in a matrix. Electric signals based on incident light are output from the plurality of photoelectric conversion devices.

The circuit substrate 430 performs signal processing to convert the electric signals output from the image pickup device 420 into image data and output the image data. The image pickup device 420 and the circuit substrate 430 function as an imaging unit that outputs an image based on the optical image input to the light-receiving surface.

The housing 440 houses the optical system 410, the image pickup device 420, and the circuit substrate 430.

Figure 5:
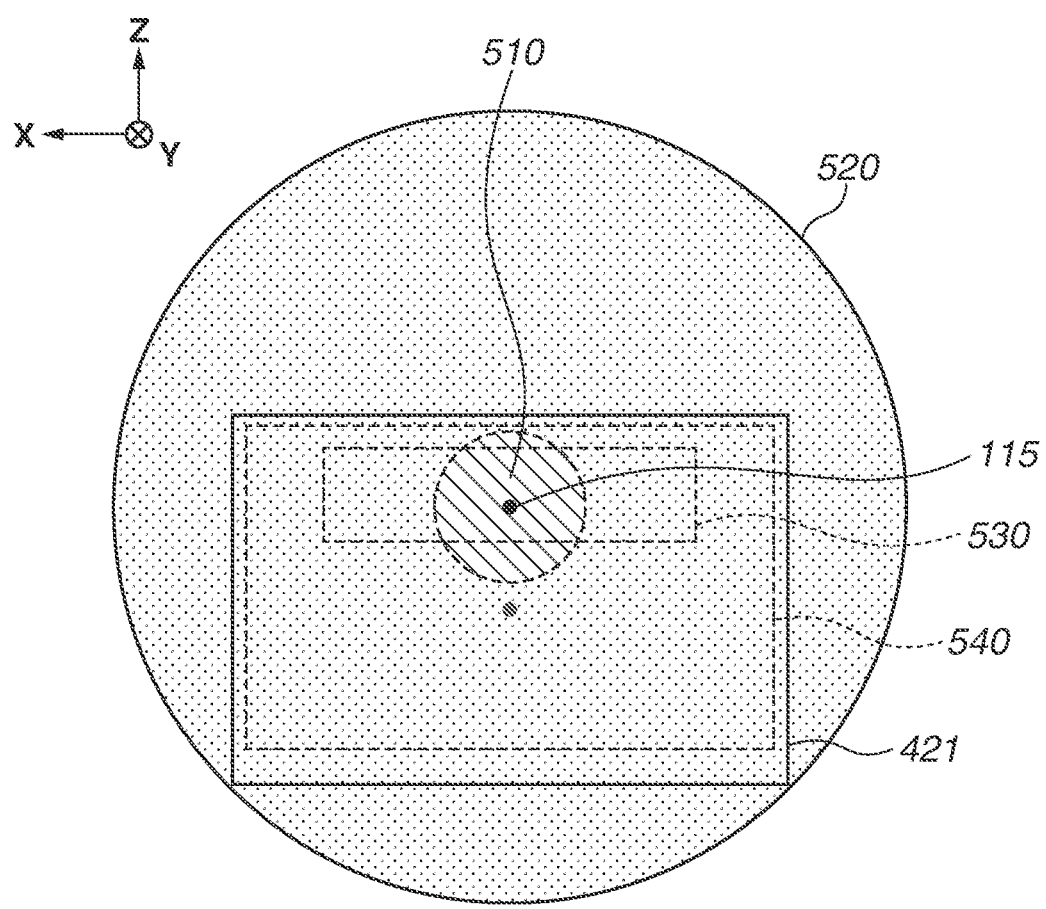
FIG. 5 is a schematic diagram illustrating a positional relationship between an image pickup device and a subject image formed by an optical system.

FIG. 5 is a schematic diagram illustrating a positional relationship between the image pickup device 420 and the subject image formed by the optical system 410. FIG. 5 illustrates the light-receiving surface 421 of the image pickup device 420 viewed from a front direction (Y-axis direction). As illustrated in FIG. 5, the optical system 410 and the image pickup device 420 are arranged so that the optical axis 115 serving as an optical center of the optical system 410 is shifted with respect to a center of the light-receiving surface 421 in a vertical direction (Z-axis direction).

A high-resolution region 510 and a peripheral resolution region 520 are input to a plane in parallel to the light-receiving surface 421 through the optical system 410. The high-resolution region 510 is a region centering on the optical axis 115, and is formed as an image on the light-receiving surface 421. The high-resolution region 510 constitutes an image at an angle of view corresponding to the viewing field range 110.

The peripheral resolution region 520 is a region surrounding the high-resolution region 510 centering on the high-resolution region 510. A portion of the peripheral resolution region 520 formed as an image on the light-receiving surface 421 constitutes an image at an angle of view corresponding to the viewing field range 120. The optical system 410 and the image pickup device 420 are arranged so that a region that is formed as an image on the light-receiving surface 421 and converted into an image is mainly the lower side (Z-axis negative direction) of the peripheral resolution region 520.

Thus, in an image output from the camera 100, the region occupied by the image in the viewing field range 110 corresponding to the high-resolution region 510 is arranged on an upper side of the center of the image. Further, in the image output from the camera 100, the region occupied by the image in the viewing field range 120 corresponding to the peripheral resolution region 520 has a larger size on the lower side of the center of the image than a size on the upper side of the center of the image. In other words, as illustrated in FIG. 1, the viewing field range 120 is set so that a region on the upper side of the optical axis 115 (in the Z-axis positive direction) is narrow and a region on the lower side of the optical axis 115 (Z-axis negative direction) is wide, i.e., set to be asymmetrical in the vertical direction.

The control unit 310 causes the electronic rear-view mirror 210 to display a partial image obtained by cutting out a region including the high-resolution region 510 that is formed as an image on the light-receiving surface 421, i.e., an output range 530 including part of the region that is the captured image of the viewing field range 110, of the image output from the camera 100. Such display of the electronic rear-view mirror 210 is used to check and monitor the rear during normal traveling.

The control unit 310 causes the monitor 220 to display a partial image obtained by cutting out an output range 540 including the output range 530 from the image output from the camera 100. The output range 540 is a range cut out to be wider than the output range 530, or a range including the entire image formed on the light-receiving surface 421. Such display on the monitor 220 is used to check the periphery of the moving object 10 in the area behind the moving object 10. The output range 540 includes a large portion of the peripheral resolution region 520 formed as the image on the light-receiving surface 421, i.e., a large portion of the captured image of the viewing field range 120.

The camera 100 is arranged in the rear portion of the moving object 10 so that the optical axis 115 is inclined upward (at an elevation angle) with respect to the traveling direction (Y-axis) of the moving object 10. At this time, a lower end of the viewing field range 110 is arranged to be inclined downward (Z-axis negative direction) with respect to a plane extending from a front end portion of the camera 100 to the rear of the moving object 10. With this arrangement, in the viewing field range 110, a road surface or the like in the area behind the moving object 10 can be included in a field of view. More specifically, the viewing field range 110 includes the area in the backward direction of the moving object 10, and the range viewable by the driver 11 with the conventional rear-view mirror.

In addition, the viewing field range 120 has a larger region on the lower side (Z-axis negative direction) of the plane passing through the front end portion of the camera 100 and extending to the rear (Y-axis negative direction) of the moving object 10. This facilitates arrangement of the viewing field range 120 so as to include a tangent line of a front lens on an outermost portion of the optical system 410 of the camera 100 and an exterior of the rear portion of the moving object 10. This means that the viewing field range 120 always includes a rear end Zb of the moving object 10. Hence, displaying an image including the lower side of the viewing field range 120 on the monitor 220 makes it easier for the driver 11 to check details of the area behind the moving object 10 when moving the moving object 10 backward.

Using the camera system 300 configured as described above enables acquisition of an image for the electronic rear-view mirror 210 and an image for monitoring the rear from one camera 100. In addition, even if the camera 100 is installed at a position on the lower side of the moving object 10, inclining the viewing field range 110 corresponding to the high-resolution region 510 upward in the area behind the moving object 10 allows the driver 11 to check the range, which has been viewable with the conventional rear-view mirror, with the electronic rear-view mirror 210. Furthermore, since a lower end portion of the viewing field range 110 is inclined in the Z-axis negative direction, part of a road surface in the area behind the moving object 10 can also be checked.

Figure 6:
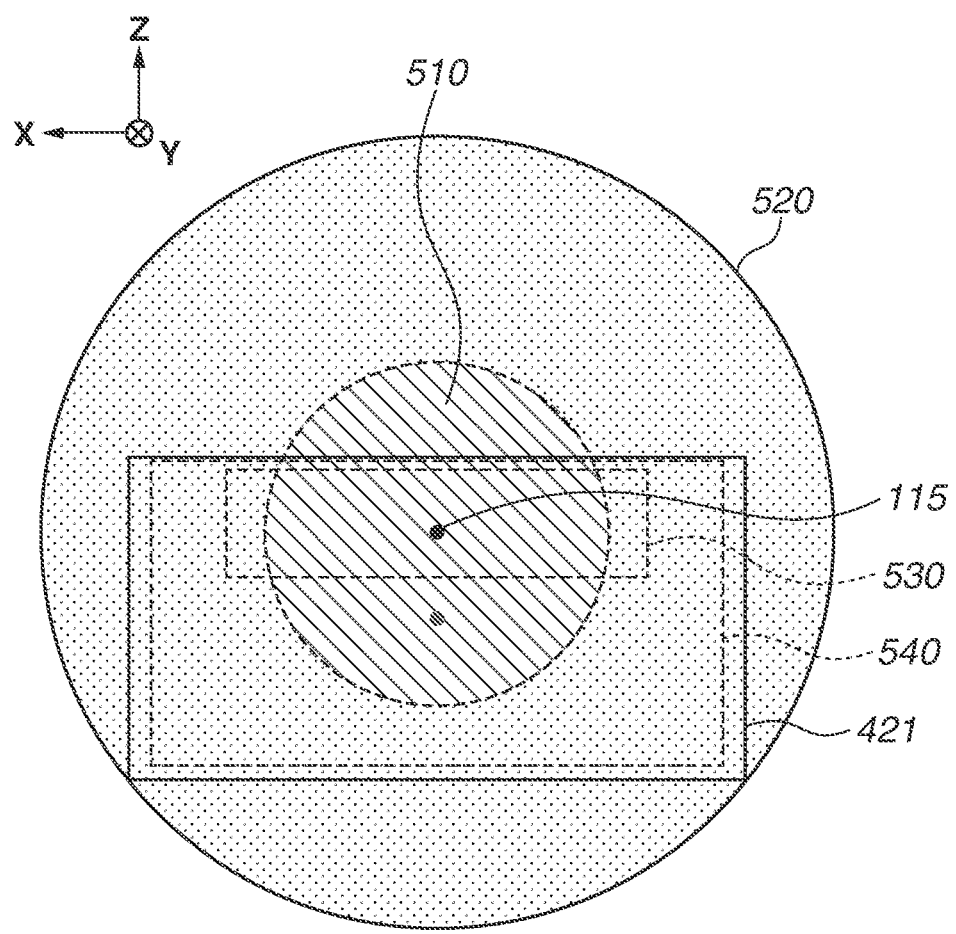
FIG. 6 is a schematic diagram illustrating a modification example of a high-resolution region and a peripheral resolution region on a light-receiving surface.
Figure 7:
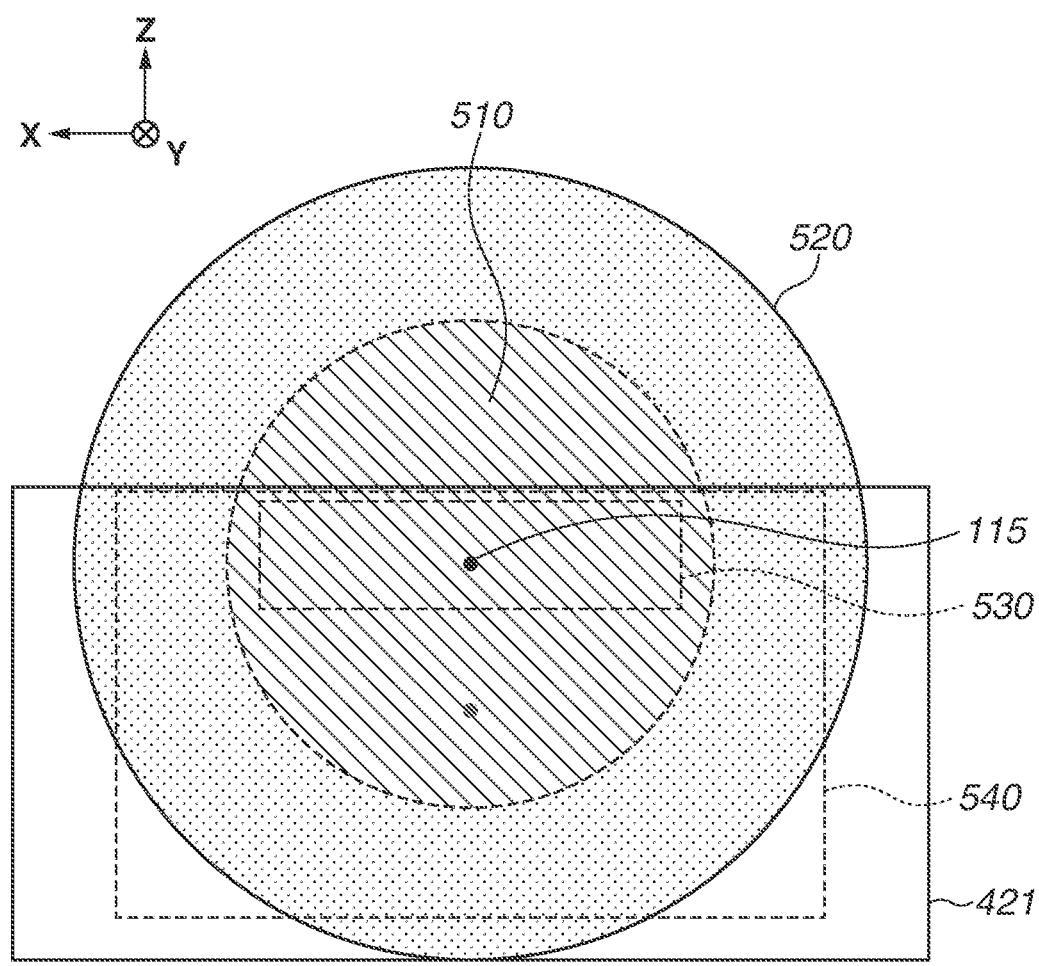
FIG. 7 is a schematic diagram illustrating another modification example of the high-resolution region and the peripheral resolution region on the light-receiving surface.

A relationship between the high-resolution region 510 and the peripheral resolution region 520 on the light-receiving surface 421 is not limited to the above-described example (in FIG. 5). FIG. 6 is a schematic diagram illustrating a modification example of the high-resolution region 510 and the peripheral resolution region 520 on the light-receiving surface 421. As illustrated in FIG. 6, a configuration in which part of the high-resolution region 510 extends beyond the light-receiving surface 421 may be employed. FIG. 7 is a schematic diagram illustrating another modification example of the high-resolution region 510 and the peripheral resolution region 520 on the light-receiving surface 421. As illustrated in FIG. 7, a configuration in which both the high-resolution region 510 and the peripheral resolution region 520 cover only part of the light-receiving surface 421 may be employed.

While the viewing field range 110 has been described as a range centering on the optical axis 115 in the present exemplary embodiment, the electronic rear-view mirror 210 can be formed so that the center of the viewing field range 110 is shifted from the optical axis 115. Further, the center of the output range 530 used for display of the electronic rear-view mirror 210 may be shifted from the optical axis 115.

While the optical axis 115 has been described as being shifted in the vertical direction (Z-axis direction) with respect to the center of the light-receiving surface 421, the optical axis 115 can be shifted in a horizontal direction (X-axis direction).

While the center of the viewing field range 110 in the vertical direction and the optical axis 115 do not coincide with each other in the examples illustrated in FIGS. 6 and 7, similarly, the viewing field range 120 can be set to have a narrow range on the Z-axis positive direction side and a wide range on the Z-axis negative direction side with respect to the optical axis 115, i.e., to be asymmetrical in the vertical direction.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-076753, filed Apr. 28, 2021, which is hereby incorporated by reference herein in its entirety.

What is claimed is:

1. An imaging apparatus provided in a moving object to capture an image of an area behind the moving object, the imaging apparatus comprising:
an imaging circuit configured to output an image based on an optical image input to a light-receiving surface; and
an optical system configured to input the optical image to the imaging circuit,
wherein the optical system forms an optical image with a first region at a first magnification and a second region at a second magnification lower than the first magnification, the second region being formed around the first region, and
wherein the imaging apparatus is installed in the moving object so that, on the light-receiving surface of the imaging circuit, an optical axis passing through a center of the first region and extending in a normal direction of the light-receiving surface is inclined upward with respect to a traveling direction of the moving object.

2. The imaging apparatus according to claim 1, wherein the imaging apparatus is installed so that a viewing field range in which a subject image is input to the imaging circuit through the second region of the optical system includes a rear end of the moving object.

3. The imaging apparatus according to claim 1, further comprising a control circuit configured to cause a first display to display a first partial image of the image output by the imaging circuit, the first partial image centering on a portion obtained through the first region of the optical system.

4. The imaging apparatus according to claim 3, wherein the control circuit is configured to cause a second display different from the first display to display a second partial image of the image output by the imaging circuit, the second partial image being wider than the first partial image.

5. The imaging apparatus according to claim 1, wherein the imaging apparatus is installed in the moving object so that a rear end portion of the imaging apparatus is positioned on a front side of a rear end portion of the moving object.

6. The imaging apparatus according to claim 1, wherein the imaging apparatus is installed in the moving object so that a viewing field range in which a subject image is input to the imaging circuit through the first region of the optical system includes a straight line extending from an installation position of the imaging apparatus in the moving object to the traveling direction of the moving object.

7. A moving object including an imaging apparatus to capture an image of an area behind the moving object, the imaging apparatus comprising:
an imaging circuit configured to output an image based on an optical image input to a light-receiving surface; and
an optical system configured to input the optical image to the imaging circuit,
wherein the optical system forms an optical image with a first region at a first magnification and a second region at a second magnification lower than the first magnification, the second region being formed around the first region, and
wherein the imaging apparatus is installed in the moving object so that, on the light-receiving surface of the imaging circuit, an optical axis passing through a center of the first region and extending in a normal direction of the light-receiving surface is inclined upward with respect to a traveling direction of the moving object.

8. The moving object according to claim 7, wherein the imaging apparatus is installed so that a viewing field range in which a subject image is input to the imaging circuit through the second region of the optical system includes a rear end of the moving object.

9. The moving object according to claim 7, wherein the imaging apparatus further comprises a control circuit configured to cause a first display to display a first partial image of the image output by the imaging circuit, the first partial image centering on a portion obtained through the first region of the optical system.

10. The moving object according to claim 9, wherein the control circuit is configured to cause a second display different from the first display to display a second partial image of the image output by the imaging circuit, the second partial image being wider than the first partial image.

11. The moving object according to claim 7, wherein the imaging apparatus is installed in the moving object so that a rear end portion of the imaging apparatus is positioned on a front side of a rear end portion of the moving object.

12. The moving object according to claim 7, wherein the imaging apparatus is installed in the moving object so that a viewing field range in which a subject image is input to the imaging circuit through the first region of the optical system includes a straight line extending from an installation position of the imaging apparatus in the moving object in the traveling direction of the moving object.

* * * * *